US010435948B2

(12) United States Patent
Moreno et al.

(10) Patent No.: US 10,435,948 B2
(45) Date of Patent: Oct. 8, 2019

(54) WORKING CAP SYSTEM AND METHOD

(71) Applicant: LOUISVILLE LADDER INC., Louisville, KY (US)

(72) Inventors: Jeziel Ramos Moreno, Nuevo León C.P. (MX); Cesar Reyna Martinez, Nuevo León C.P. (MX)

(73) Assignee: Louisville Ladder Inc., Louisville, KY (US)

( * ) Notice: Subject to any disclaimer, the term of this patent is extended or adjusted under 35 U.S.C. 154(b) by 81 days.

(21) Appl. No.: 15/479,754

(22) Filed: Apr. 5, 2017

(65) Prior Publication Data

US 2018/0291685 A1 Oct. 11, 2018

(51) Int. Cl.
*B23Q 3/00* (2006.01)
*E06C 7/14* (2006.01)
*B25H 1/06* (2006.01)

(52) U.S. Cl.
CPC *E06C 7/14* (2013.01); *B25H 1/06* (2013.01)

(58) Field of Classification Search
USPC ....... 269/9, 296, 900, 902; 182/181.1, 183.1
See application file for complete search history.

(56) References Cited

U.S. PATENT DOCUMENTS 4,298,095 A * 11/1981 Jackson .................. B25H 1/06 182/182.4
D310,884 S 9/1990 Patton et al.
5,101,932 A * 4/1992 Trudgeon ................ B25H 1/06 182/129
D340,773 S 10/1993 Bartnicki et al.
5,351,730 A * 10/1994 Lewellen ................ B25H 1/06 108/59
5,358,070 A 10/1994 Bartnicki et al.
(Continued)

FOREIGN PATENT DOCUMENTS

GB 2343650 A 5/2000
GB 2478318 A 9/2011

OTHER PUBLICATIONS

CA, Examination Search Report, Application No. 2,965,646, dated Jun. 8, 2018.

(Continued)

*Primary Examiner* — Joseph J Hail
*Assistant Examiner* — Shantese L McDonald
(74) *Attorney, Agent, or Firm* — Orrick, Herrington & Sutcliffe LLP

(57) ABSTRACT

A working cap system suitable for supporting an extensive variety of construction materials and methods for manufacturing and using same. The working cap system can include an integrated working region with first and second support regions. The first support region can include a first support surface that is bounded by a pair of opposite first peripheral side surfaces; whereas, the second support region can be disposed within the first support surface and include a second support surface that is bounded by a pair of opposite second side surfaces. The first side surfaces, the first support surface, the second side surfaces and second support surface can define a central channel for receiving a selected work piece with a predetermined cross-section. Thereby, a wide variety of construction materials thereby can be supported by the working cap system.

20 Claims, 13 Drawing Sheets

(56) References Cited

U.S. PATENT DOCUMENTS

| | | | | |
|---|---|---|---|---|
| 5,573,081 | A | 11/1996 | Bartnicki et al. | |
| D413,990 | S | 9/1999 | Bartnicki et al. | |
| D422,717 | S | 4/2000 | Bartnicki et al. | |
| D531,322 | S | 10/2006 | Patton et al. | |
| 8,210,313 | B2 | 7/2012 | Astor | |
| 8,272,478 | B2 | 9/2012 | Astor et al. | |
| 8,403,314 | B2 * | 3/2013 | Chung | B25H 1/08 269/136 |
| 9,435,155 | B2 | 9/2016 | Tiber et al. | |
| 2008/0302604 | A1 | 12/2008 | Kramer | |
| 2010/0064873 | A1 * | 3/2010 | Chung | B25H 1/08 83/829 |
| 2014/0008499 | A1 | 1/2014 | Astor | |

OTHER PUBLICATIONS

CA, Examination Search Report, Application No. 2,965,646, dated Mar. 28, 2019.

* cited by examiner

WORKING CAP SYSTEM AND METHOD

FIELD

The disclosed embodiments relate generally to mechanical support assemblies and more particularly, but not exclusively, to working cap systems suitable for installation on ladders, step stools and other platforms.

BACKGROUND

A construction site can be a very dangerous place. Workers often carry lumber, bracing, pipes and other construction materials around the site. Upon being delivered to an installation location, the materials are placed on a sawhorse and then measured and cut to size. A ladder is used to install the materials at elevations that would otherwise be beyond reach. Before climbing the ladder, a worker must confirm that the saw horse and other nearby objects do not interfere safe use of the ladder.

In view of the foregoing, a need exists for an improved system and method for supporting construction materials prior to installation that overcomes the aforementioned obstacles and deficiencies of current construction practices.

Figure 1:
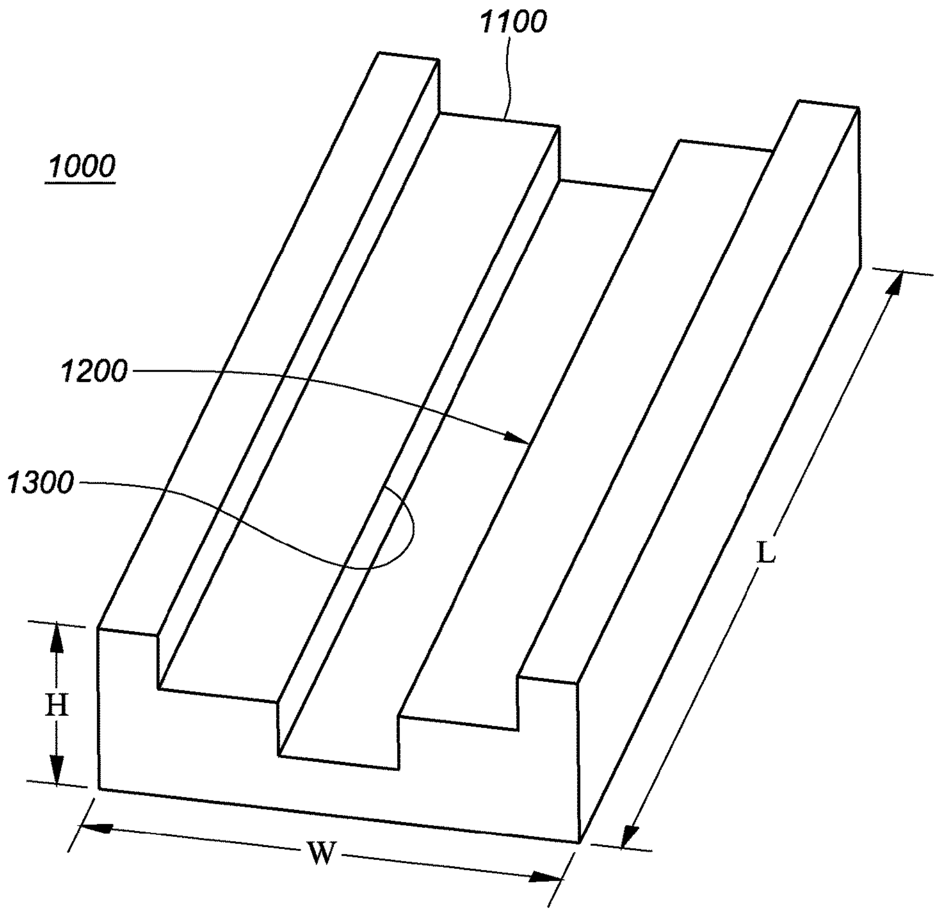
FIG. 1 is an exemplary top-level block diagram illustrating an embodiment of a working cap system for supporting work pieces having a variety shapes and sizes.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since current construction practices involve placing many objects adjacent to a ladder that might present a safety hazard, a working cap system and method for supporting construction materials during measuring, cutting and/or drilling can prove desirable and provide a basis for a wide range of applications, such as step stools, extension ladders, platform ladders and other types of ladders. This result can be achieved, according to one embodiment disclosed herein, by a working cap system 1000 as illustrated in FIG. 1.

Turning to FIG. 1, the working cap system 1000 is configured to support an extensive variety of construction materials, including, but not limited to, board and pipe in a wide range of lengths and cross-sections. The working cap system 1000 is shown as comprising a main body 1100 with an integrated working region 1200. The main body 1100 preferably is formed from a rigid material, such as metal, wood, or plastic and can have any suitable predetermined shape, size and/or dimension. The main body 1100, for example, can be manufactured in any conventional manner, including casting, molding and/or machining.

FIG. 1 shows that the main body 1100 has a length L, a width W, and a height H. The length L, width W, and height H of the main body 1100, for example, can be determined at least in part based upon the length and cross-section of the construction materials intended to be supported by the working cap system 1000. In one embodiment, the width W of the main body 1100 preferably is greater than a width of the intended construction materials. The length L and height H of the main body 1100 can be greater than, less than, or equal to the length and height, respectively, of the intended construction materials. Stated somewhat differently, the intended construction materials can be retained within, and/or extend from, the main body 1100.

The working region 1200 includes an engagement surface 1300. The engagement surface 1300 can engage and/or support a work piece 100 (shown in FIGS. 4A-B and FIGS. 5A-B) of construction material that is disposed on the working region 1200. Thereby, the engagement surface 1300 can inhibit unwanted movement by the work piece 100 while the work piece 100 is undergoing measuring, cutting, drilling and/or other types of processing. Advantageously, the engagement surface 1300 can support the work piece 100 without requiring any additional tooling for securing the work piece 100 to the working region 1200. Once processing is complete, the work piece 100 can be readily removed from the working region 1200 for installation or other use.

Although shown and described as comprising a single main body 1100 for purposes of illustration only, the working cap system 1000 can include a plurality of main bodies 1100. The main bodies 1100 can be uniform and/or different. In other words, the length L, width W and height H of a first main body 1100 can be the same as, and/or different from, the length L, width W and height H of a second main body 1100. Additionally and/or alternatively, the working regions 1200 of the main bodies 1100 can be uniform and/or different. In one embodiment, the main bodies 1100 can be provided in an interchangeable manner such that one or more predetermined main bodies 1100 can be selected, for example, based upon the size, shape, and/or dimension of the construction materials to be supported. A wide variety of construction materials thereby can be supported by the working cap system 1000.

Figure 2:
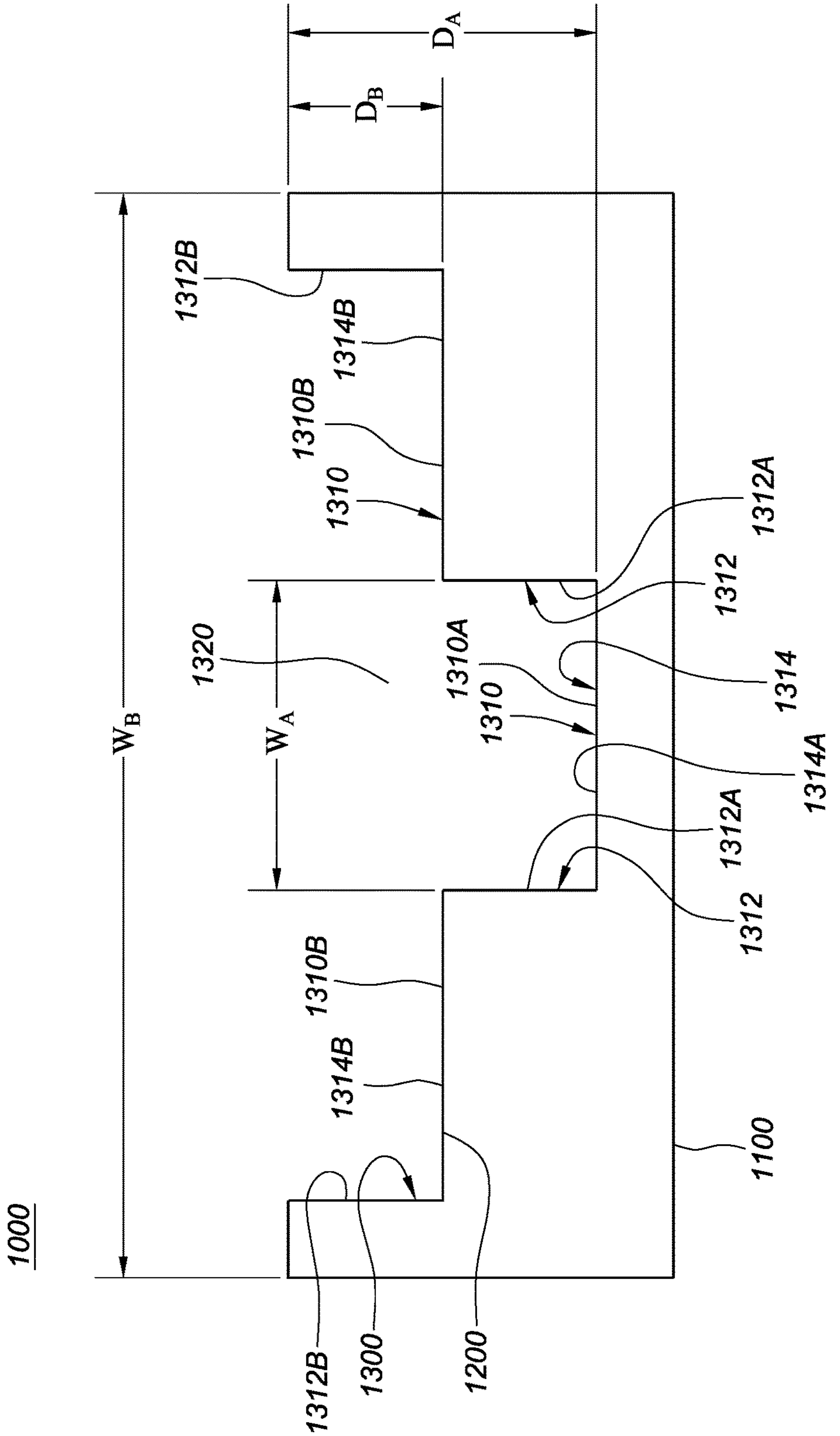
FIG. 2 is an exemplary detail diagram illustrating a cross-sectional view of the working cap system of FIG. 1.

FIG. 2 shows a representative cross-sectional view of the exemplary working cap system 1000 of FIG. 1 along a lengthwise axis of the main body 1100. The engagement surface 1300 can include one or more support regions 1310. The support regions 1310 preferably are symmetrically disposed about a centerline of the main body 1100. In some embodiments, however, at least one of the support regions 1310 can be offset from the centerline of the main body 1100. As shown in FIG. 2, for example, the support regions 1310 include a central support region 1310A that is disposed between one or more peripheral support regions 1310B. A number of peripheral support regions 1310B on each opposite side of the central support region 1310A preferably is equal but can be different depending upon a selected application of the working cap system 1000.

Each support region 1310 can include one or more side surfaces 1312 that are disposed about a support surface 1314. Stated somewhat differently, each support region 1310 can be bounded by the side surfaces 1312 and the support surface 1314. The central support region 1310A of FIG. 2 is illustrated as including a central support surface 1314A that is bounded by opposite side surfaces 1312A. The central support surface 1314A is positioned at a depth $D_A$ within the main body 1100; whereas, the opposite side surfaces 1312A are separated by a distance $W_A$. Similarly, FIG. 2 shows that the peripheral support region 1310B can include a support surface 1314B that is bounded by opposite side surfaces 1312B. The periphery support surface 1314B is positioned at a depth $D_B$ within the main body 1100, and a distance $W_B$ separates the opposite side surfaces 1312B.

Preferably, each support region 1310 can engage and/or support a respective work piece 100 (shown in FIGS. 4A-B and FIGS. 5A-B) of construction material with a predetermined size, shape and dimension. In other words, a selected work piece 100 can be engaged and/or supported by a relevant one of the support regions 1310 in the alternative. A work piece 100 with a selected dimension that is less than the distance $W_A$ between the opposite side surfaces 1312A, for example, can be received by the central support region 1310A and supported by the support surface 1314A. Additionally and/or alternatively, a work piece 100 with a selected dimension that is greater than the distance $W_A$ but less than the distance $W_B$ between the opposite side surfaces 1312B can be received by the support region 1310B and supported by the support surface 1314B. The side surfaces 1312 and support surfaces 1314 thereby can form a central channel 1320 for receiving the work piece 100, and, as the work piece 100 is received at least partially within the central channel 1320, selected surfaces 1312, 1314 of the working region 1200 can engage and support the work piece 100.

To facilitate receipt of the work piece 100 by, and/or removal of the work piece 100 from, a selected support region 1310, the size, shape and/or dimension of the selected support region 1310 can be greater than and/or equal to a relevant size, shape and/or dimension of the work piece 100. One or more of the support regions 1310 preferably can support a variety of work pieces 100 with different sizes, shapes and/or dimensions. Additionally and/or alternatively, an angle formed between at least one of the side surfaces 1312 of a selected support region 1310 and the relevant the support surface 1314 of the selected support region 1310 can comprise an obtuse angle for facilitating receipt and/or removal of the work piece 100 by the selected support region 1310. The obtuse angle can comprise any predetermined angle and/or range of predetermined angles. Exemplary ranges of predetermined angles can include an angle between 0° and 30°, including any sub-ranges, such as a one-degree sub-range (i.e., between 10° and 11°) and/or a ten-degree sub-range (i.e., between 10° and 20°), within the predetermined angle range, without limitation.

Figure 3:
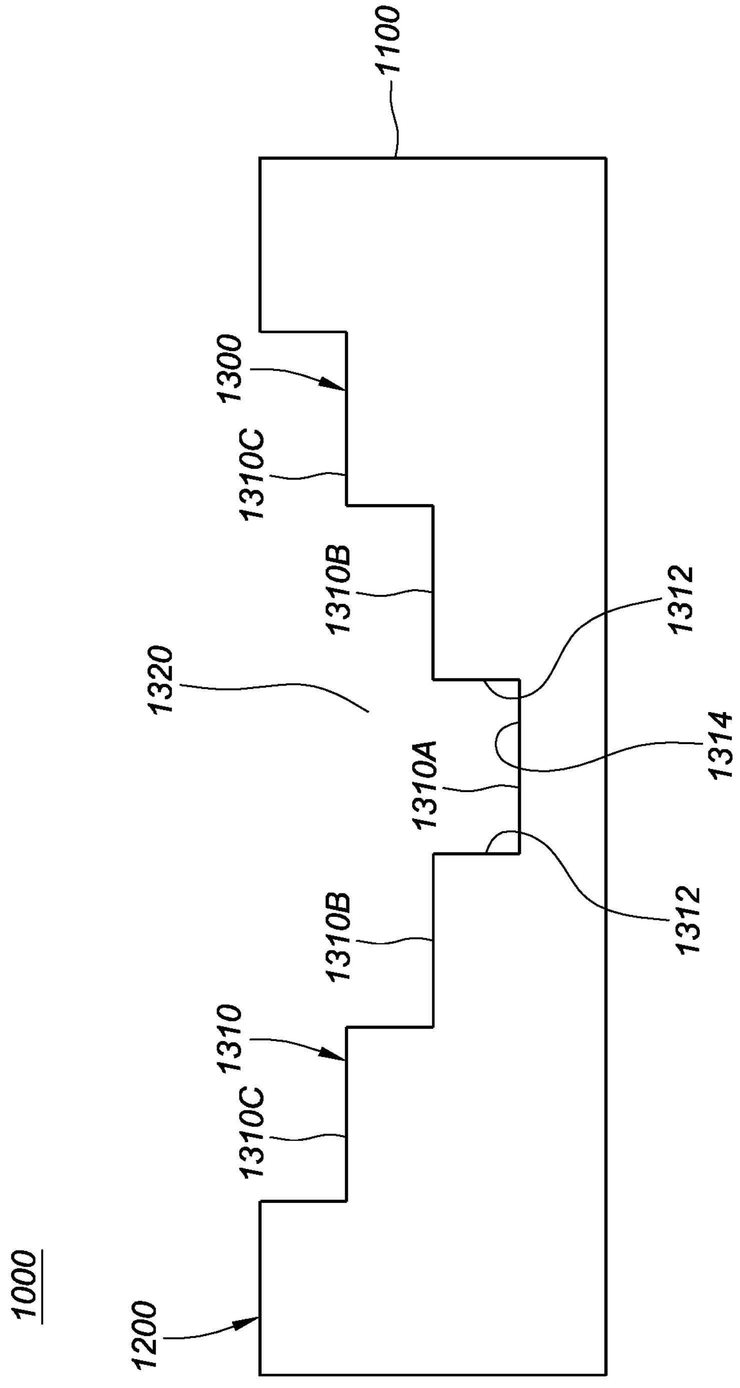
FIG. 3 is an exemplary detail diagram illustrating a cross-sectional view of an alternative embodiment of the working cap system of FIG. 1, wherein the working cap system can support an expanded variety of the work pieces.

Although shown and described with reference to FIG. 2 as including a central support region 1310A and one pair of peripheral support regions 1310B for purposes of illustration only, the engagement surface 1300 can include any predetermined number of support regions 1310. Turning to FIG. 3, for example, the engagement surface 1300 is shown as having a central support region 1310A, a first pair of peripheral support regions 1310B and a second pair of peripheral support regions 1310C. The first pair of peripheral support regions 1310B can be disposed between the central support region 1310A and the respective peripheral support regions 1310C in the second pair. Each of the support regions 1310A, 1310B, 1310C can include one or more side surfaces 1312 that are disposed about a support surface 1314 in the manner set forth above with reference to FIG. 2. In other words, each of the support regions 1310A, 1310B, 1310C can be bounded by a respective support surface 1314 and side surfaces 1312.

As shown in FIG. 3, the working region 1200 can provide a series (or succession) of support regions 1310 with a progression of depths $D_A$, $D_B$ (shown in FIG. 2). Stated somewhat differently, the working region 1200 can comprise a plurality of support regions 1310 with progressively increasing (or decreasing) depths $D_A$, $D_B$. A difference between the depths $D_A$, $D_B$ of adjacent support regions 1310 can be uniform and/or different. For example, the difference between the depth $D_A$ of the support region 1310A and the depth $D_B$ of the support region 1310B can be the same as, or different from, the difference between the depth $D_B$ of the support region 1310B and the depth of the support region 1310C. The succession of support regions 1310 likewise can provide distances $W_A$, $W_B$ (shown in FIG. 2) between the opposite side surfaces 1312 that are progressively narrower as the depths $D_A$, $D_B$ increase. A difference between the distances $W_A$, $W_B$ for adjacent support regions 1310 can be uniform and/or different. The difference between the distance $W_A$ formed by the support region 1310A and the distance $W_B$ formed by the support region 1310B, for instance, can be the same as, or different from, the distance $W_B$ formed by the support region 1310B and the distance formed by the support region 1310C.

The working region 1200 can be manufactured in any conventional manner. For example, the working region 1200 can be cast, molded and/or machined. In one embodiment, the support region 1310C can include a first support surface 1314 (shown in FIG. 2) that is bounded by a pair of opposite first peripheral side surfaces 1312 (shown in FIG. 2). The support region 1310B, in turn, can be disposed within the first support surface 1314 of the support region 1310C and include a second support surface 1314 that is bounded by a pair of opposite second peripheral side surfaces 1312. The first side surfaces 1312, the first support surface 1314, the second side surfaces 1312 and second support surface 1314 define the central channel 1320 for receiving the selected work piece 100 with a predetermined cross-section. Optionally, the third support region 1310C can be disposed within the second support surface 1314 of the support region 1310B and include a third support surface 1314 that is bounded by a pair of opposite third peripheral side surfaces 1312. The third side surfaces 1312 and the third support surface 1314 can further define the central channel 1320. The working cap system 1000 thereby can engage and/or support work pieces 100 with a wide range of predetermined sizes, shapes and/or dimensions.

Figure 4A:
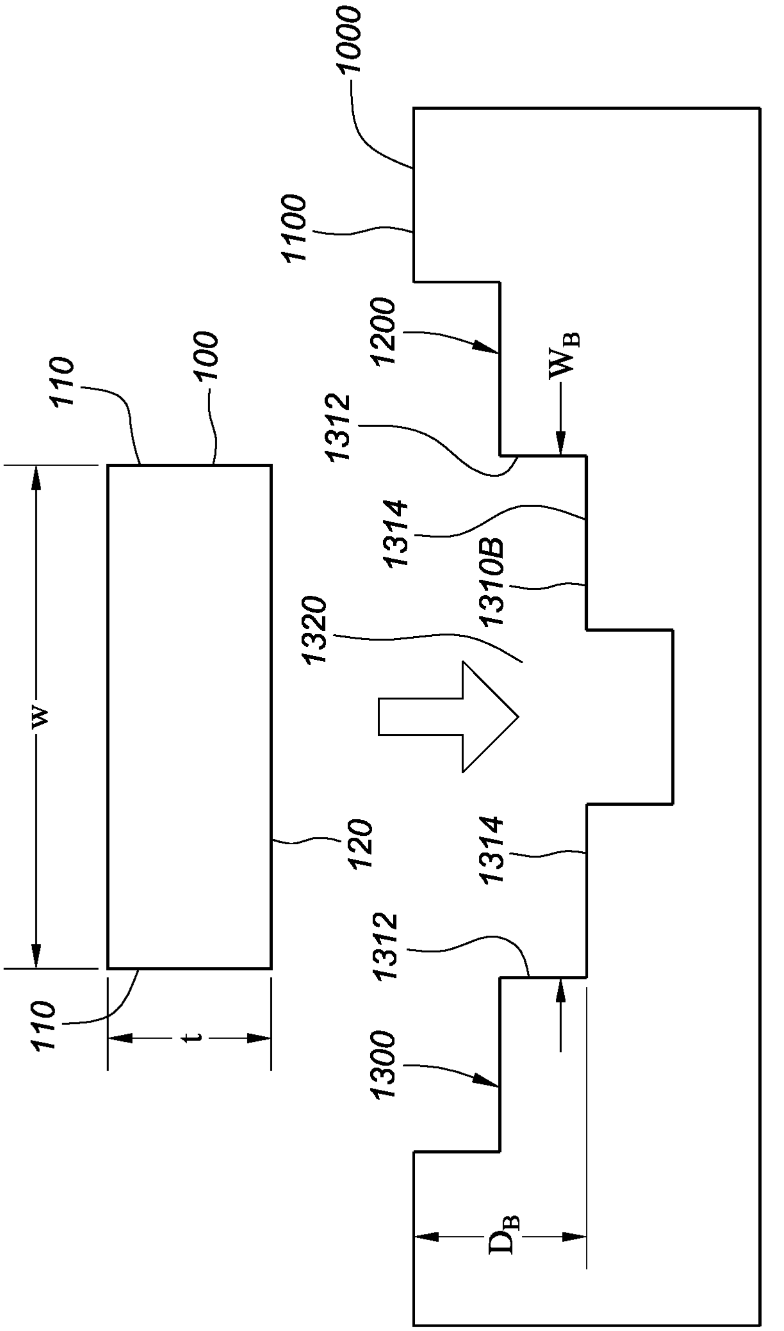
FIG. 4A is an exemplary detail diagram illustrating the working cap system of FIG. 3 receiving a selected work piece with a rectangular cross-section.
Figure 4B:
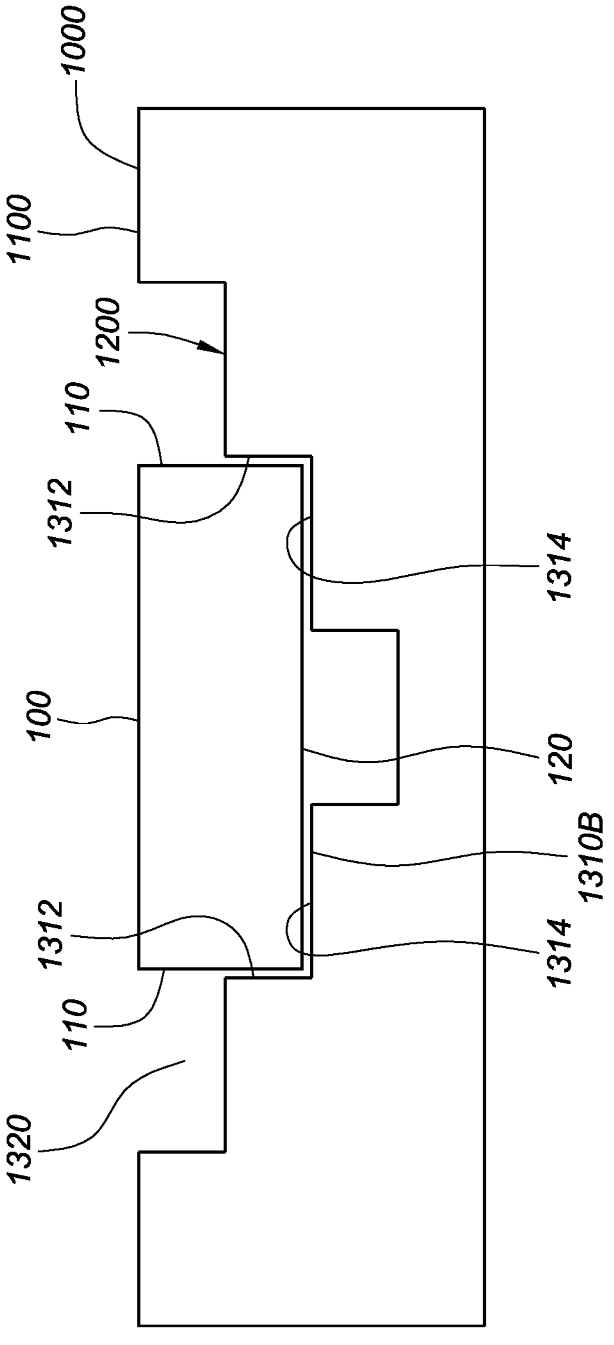
FIG. 4B is an exemplary detail diagram illustrating the working cap system of FIG. 4A supporting the selected work piece.

FIGS. 4A-B show the working cap system 1000 as receiving a selected work piece 100. Having a rectangular cross-section with a width w and a thickness t, the selected work piece 100 has a lower surface 120 and opposite side surfaces 110. The selected work piece 100, for example, can be a wooden board, such as a standardized 4"×1" board, wherein the width w is four inches and the thickness t is one inch.

As illustrated in FIG. 4A, the selected work piece 100 can be lowered into the central channel 1320 formed by the working cap system 1000 until the selected work piece 100 contacts the working region 1200. The side surfaces 1312 of the support regions 1310 can help guide the selected work piece 100 into an appropriate support region 1310. Preferably, the selected work piece 100 is disposed in the support region 1310 with the smallest distance between the opposite side surfaces 1312 that will accommodate the width w of the selected work piece 100. In this example, the support region 1310B is shown as having a distance $W_B$ between the opposite side surfaces 1312 that can accommodate the width w of the selected work piece 100. The selected work piece 100 continues to be received by the working region 1200 until the lower surface 120 contacts the support surface 1314 of the support region 1310B as shown in FIG. 4B.

Upon contacting the support surface 1314 of the support region 1310B, the selected work piece 100 can be supported on up to three sides by the working region 1200. In other words, the side surfaces 1312 of the support region 1310B can engage the side surfaces 110; whereas, the support surface 1314 of the support region 1310B can engage the lower surface 120. The working region 1200 thereby can support the selected work piece 100 in a stable manner such that further processing, such as measuring, cutting and/or drilling, of the selected work piece 100 can be safely performed. As shown in FIGS. 4A-B, the depth $D_B$ of the support region 1310B can permit a portion of the selected work piece 100 to extend from the working region 1200 to help facilitate easy removal of the selected work piece 100 once the further processing is complete.

Returning briefly to FIG. 3, each of the support regions 1310A, 1310B, 1310C optionally can be configured to support a respective standardized board size (or a predetermined range of standardized board sizes). In one embodiment, the distance between the opposite side surfaces 1312 of the central support region 1310A can be suitable for supporting and/or engaging boards with smaller sizes, cross-sections and/or dimensions, such as a standardized 2"×1" rectangular board with a width of two inches and a thickness of one inch. Additionally and/or alternatively, the distance between the opposite side surfaces 1312 of the peripheral support region 1310B can be suitable for supporting and/or engaging boards with medium sizes, cross-sections and/or dimensions, such as a standardized 4"×1" rectangular board with a width of four inches and a thickness of one inch. Additionally and/or alternatively, the distance between the opposite side surfaces 1312 of the peripheral support region 1310C can be suitable for supporting and/or engaging boards with larger sizes, cross-sections and/or dimensions, such as a standardized 6"×1" rectangular board with a width of six inches and a thickness of one inch. In the manner set forth above, the working region 1200 can include one or more additional support regions for supporting additional and/or alternative standardized board widths.

Figure 5A:
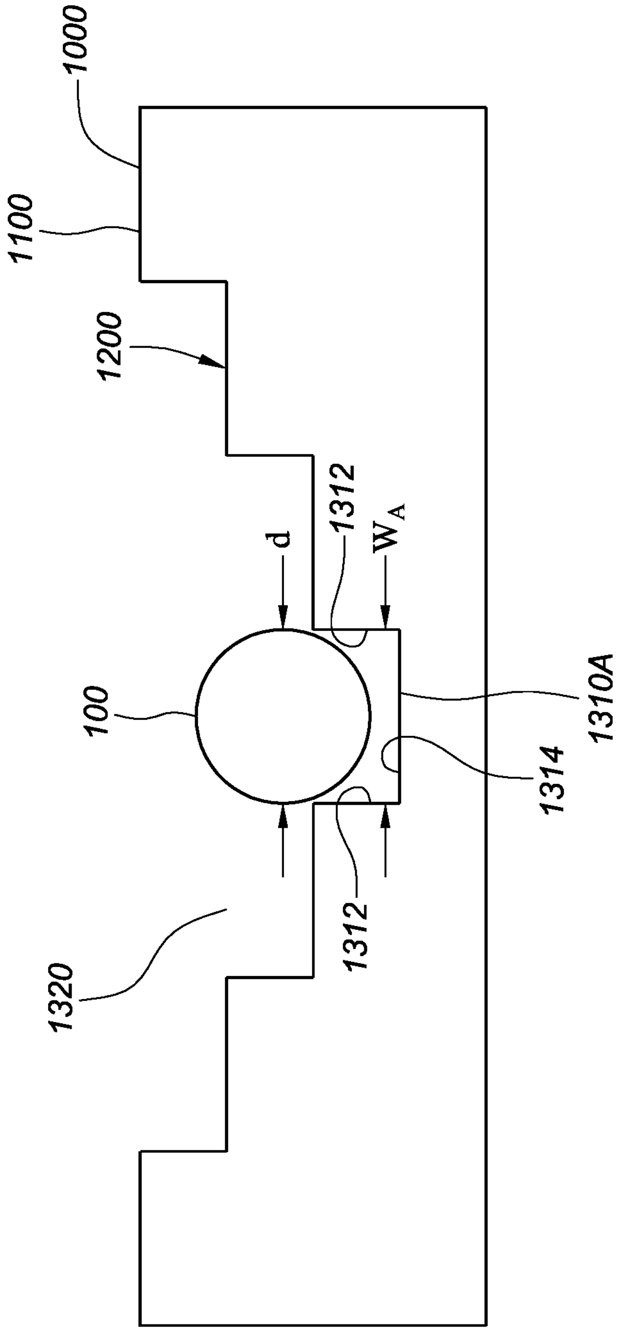
FIG. 5A is an exemplary detail diagram illustrating the working cap system of FIG. 3 supporting a selected work piece with a round cross-section.

Advantageously, the working region 1200 can support work pieces 100 with a variety of shapes, sizes and/or dimensions. For example, FIG. 5A illustrates the working region 1200 as supporting a selected work piece 100 with a round cross-section, such as a pipe. The selected work piece 100 is shown as having a predetermined diameter d. In the manner set forth in more detail above with reference to FIGS. 4A-B, the selected work piece 100 can be lowered into the central channel 1320 formed by the working cap system 1000 until the selected work piece 100 contacts the working region 1200. The side surfaces 1312 of the support regions 1310 can help guide the selected work piece 100 into an appropriate support region 1310. Preferably, the selected work piece 100 is disposed in the support region 1310 with the smallest distance between the opposite side surfaces 1312 that will accommodate the diameter d of the selected work piece 100. In this example, the central support region 1310A is shown as having a distance $W_A$ between the opposite side surfaces 1312 that can accommodate the diameter d of the selected work piece 100.

The selected work piece 100 continues to be received by the working region 1200 until contacting the support surface 1314 of the central support region 1310A as shown in FIG. 5A. Upon contacting the support surface 1314 of the central support region 1310A, the selected work piece 100 can be supported on up to three sides by the working region 1200. In other words, the side surfaces 1312 and/or the support surface 1314 of the support region 1310B can engage the selected work piece 100. The working region 1200 thereby can support the selected work piece 100 with the round cross-section in a stable manner such that further processing, such as measuring, cutting and/or drilling, of the selected work piece 100 can be safely performed. As shown in FIG. 5A, a portion of the selected work piece 100 can extend from the working region 1200 to help facilitate easy removal of the selected work piece 100 once the further processing is complete.

Figure 5B:
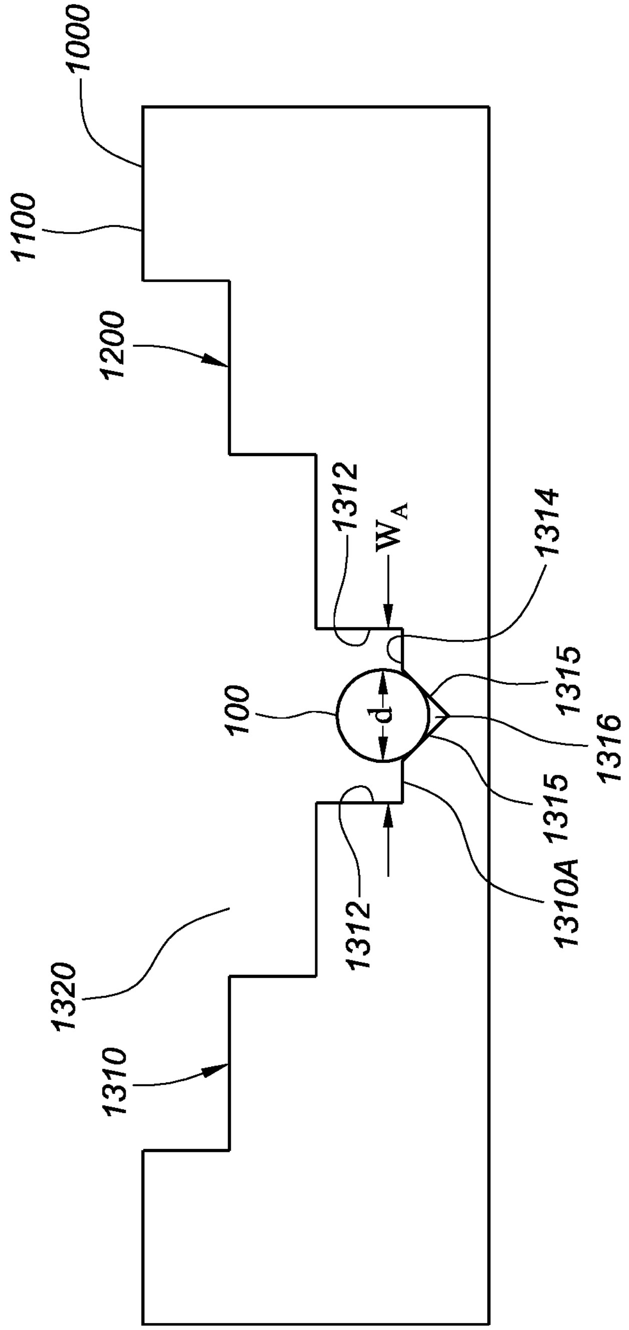
FIG. 5B is an exemplary detail diagram illustrating an alternative embodiment of the working cap system of FIG. 5A, wherein the working cap system forms an optional aperture for supporting the selected work piece with small cross-sectional diameter.

Another alternative embodiment of the working cap system 1000 is shown in FIG. 5B. As illustrated in FIG. 5B, the support surface 1314 of the central support region 1310A defines an optional aperture 1316. The aperture 1316 can have any suitable size, shape and/or dimension and can extend completely, or partially (as shown in FIG. 5B) through the main body 1100. The support surface 1314 preferably defines the aperture 1316 with a shape that converges toward a center axis of the aperture 1316. For example, the support surface 1314 of the central support region 1310A can include one or more chamfered portions 1315 as shown in FIG. 5B. The aperture 1316 preferably is defined in a central area of the support surface 1314 of the central support region 1310A and, in some embodiments, can be offset from the central area of the support surface 1314.

Advantageously, the aperture 1316 can help support a selected work piece 100 with a predetermined dimension that is less than the distance $W_A$ between the opposite side surfaces 1312 of the central support region 1310A. The selected work piece 100 of FIG. 5B, for example, is shown as having a round cross-section with a predetermined diameter d that is less than the distance $W_A$. Upon being received by the central channel 1320, the selected work piece 100 can approach the central support region 1310A of the working region 1200 in the manner discussed in more detail above with reference to the working cap system 1000 of FIG. 5A. With the predetermined dimension that is less than the distance $W_A$, the selected work piece 100 can pass between the opposite side surfaces 1312 of the central support region 1310A and contact the support surface 1314 of the central support region 1310A. The aperture 1316 thereby can engage and/or support the selected work piece 100 in a stable manner such that further processing, such as measuring, cutting and/or drilling, of the selected work piece 100 can be safely performed.

Although shown and described as being defined by the central support region 1310A with reference to FIG. 5B for purposes of illustration only, the aperture 1316 can be defined by the support surface 1314 of any selected support region 1310 of the working region 1200. In one embodiment, the support surface 1314 of the selected support region 1310 can define a plurality of the apertures 1316 and/or the support surfaces 1314 of a plurality of the support regions 1310 can define a respective aperture 1316. Advantageously, the apertures 1316 can have uniform and/or different sizes, shapes and/or dimensions for engaging and supporting a variety of work pieces 100 with a wide range of sizes, shapes and/or dimensions, such as round work pieces 100 with a wide range of diameters d.

Figure 6A:
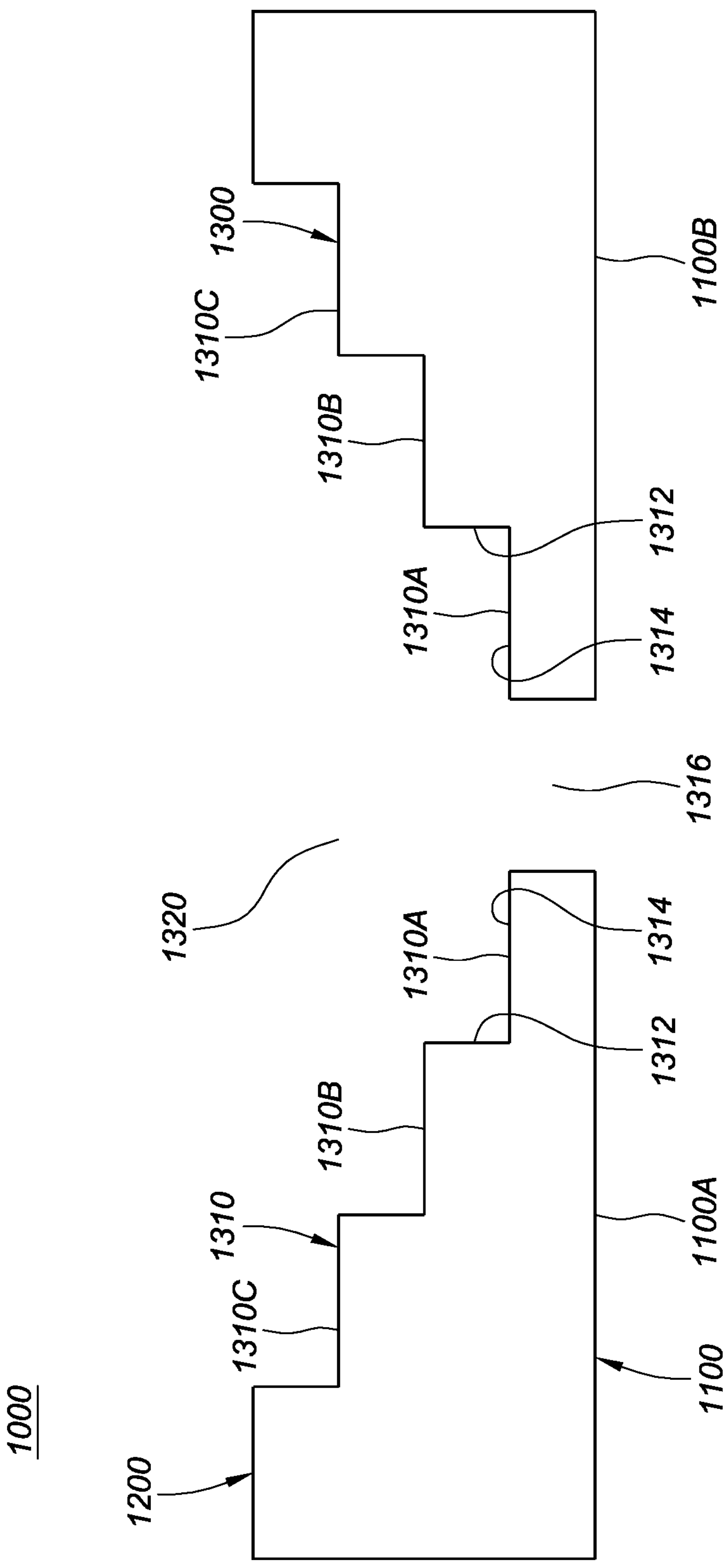
FIG. 6A is an exemplary detail diagram illustrating an alternative embodiment of the working cap system of FIG. 3, wherein the working cap system comprises two separate body regions.

In an alternative embodiment, the main body 1100 of the working cap system 1000 can be provided as a predetermined number of separate body regions. Turning to FIG. 6A, for example, the working cap system 1000 of FIG. 3 is shown as comprising a first body region 1100A that is separate from a second body region 1100B. The first and second body regions 1100A, 1100B can provide respective support regions 1310A, 1310B, 1310C with side surfaces 1312 and support surfaces 1314 in the manner set forth above with reference to FIG. 3.

As shown in FIG. 6A, for example, the first body region 1100A can provide a series (or succession) of partial support regions 1310 with a progression of depths $D_A$, $D_B$ (shown in FIG. 2). The first body region 1100A, in other words, can comprise a plurality of partial support regions 1310A, 1310B, 1310C with progressively increasing (or decreasing) depths. In one embodiment, the first body region 1100A can be provided as a stair-step arrangement of the partial support regions 1310 with the respective support surfaces 1314 being disposed at progressively increasing (or decreasing) levels from a distal portion of the first body region 1100A to a proximal portion of the first body region 1100A. The second body region 1100B can be provided in a manner similar to the first body region 1100A and preferably comprises a mirror-image of the first body region 1100A.

Thereby, when the distal portion of the first body region 1100A is disposed adjacent to, and/or otherwise cooperates with, the distal portion of the second body region 1100B, the first and second body regions 1100A, 1100B can cooperate. The partial support region 1310A of the first body region 1100A, for example, can cooperate with the partial support region 1310A of the second body region 1100B to form the composite support region 1310A of the working region 1200 in the manner set forth in more detail above with reference to the working region 1200 of FIG. 3. The composite support region 1310A of the working region 1200 can be bounded by the side surface 1312 of the partial support region 1310A of the first body region 1100A and the side surface 1312 of the partial support region 1310A of the second body region 1100B.

The partial support regions 1310B of the first and second body regions 1100A, 1100B likewise can form the composite support region 1310B of the working region 1200 in a similar manner. The composite support region 1310B of the working region 1200 can be bounded by the side surface 1312 of the partial support region 1310B of the first body region 1100A and the side surface 1312 of the partial support region 1310B of the first second region 1100B. Similarly, the partial support regions 1310C of the first and second body regions 1100A, 1100B can form the composite support region 1310C of the working region 1200. The composite support region 1310C of the working region 1200 can be bounded by the side surface 1312 of the partial support region 1310C of the first body region 1100A and the side surface 1312 of the partial support region 1310C of the first second region 1100B.

The first and second body regions 1100A, 1100B thereby can cooperate to provide the working region 1200 and can form the central channel 1320 for receiving a selected work piece work piece 100 (shown in FIGS. 4A-B and FIGS. 5A-B) of construction material, and, as the work piece 100 is received at least partially within the central channel 1320, selected surfaces 1312, 1314 of the working region 1200 can engage and support the work piece 100 as discussed above.

Figure 6B:
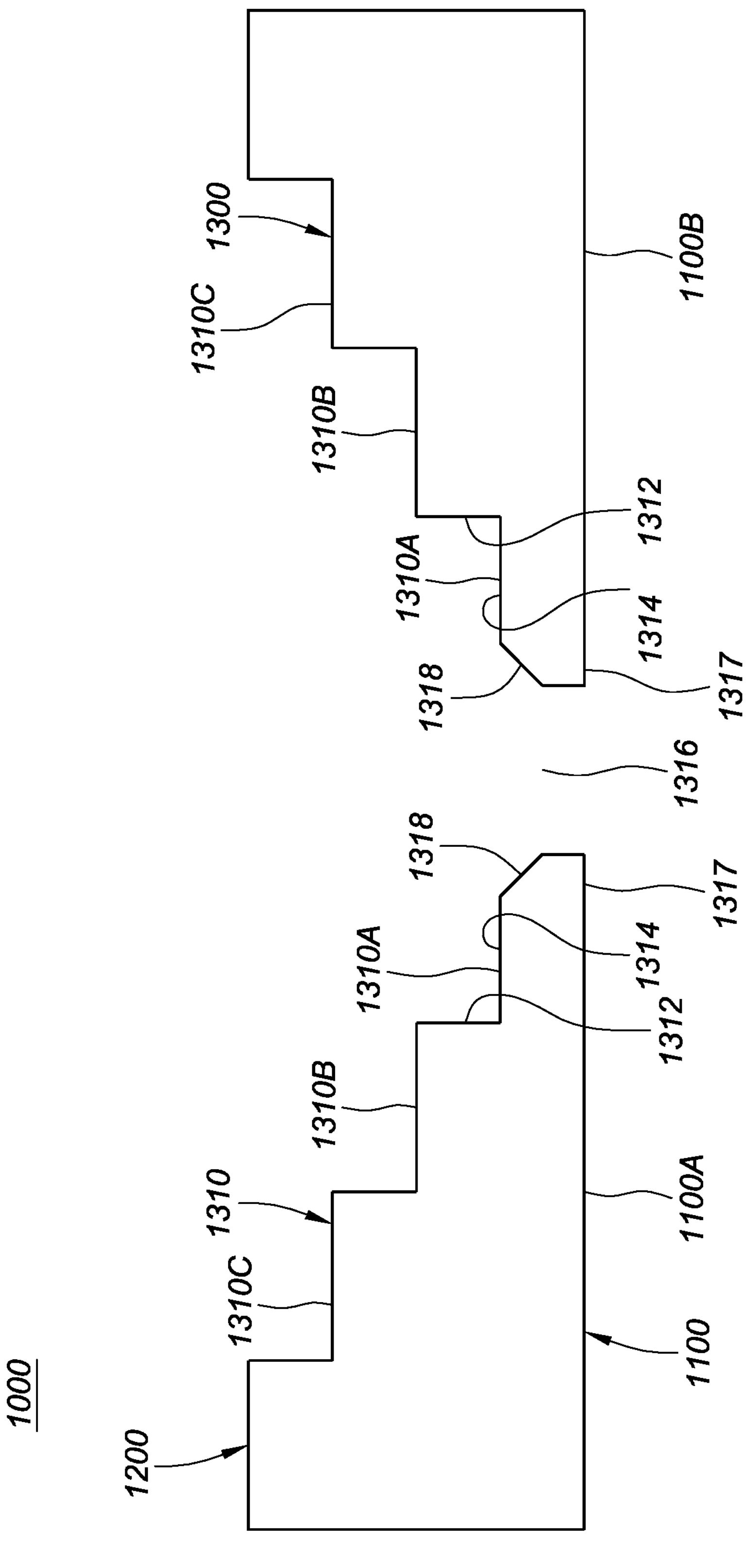
FIG. 6B is an exemplary detail diagram illustrating an alternative embodiment of the working cap system of FIG. 6A, wherein each of the body regions includes a chamfered portion for facilitating engagement of round work pieces with small cross-sectional diameters.

When the first body region 1100A is disposed adjacent to, and/or otherwise cooperates with, the second body region 1100B, the central support regions 1310A of the body regions 1100A, 1100B optionally can define an intermediate aperture 1316 as illustrated in FIG. 6B. In the manner set forth in more detail above with reference to the working cap system 1000 of FIG. 5B, the aperture 1316 advantageously can engage and/or support round work pieces 100 with small cross-sectional diameters d (collectively shown in FIG. 5B). The diameters d of such round work pieces 100 are less than a predetermined distance between the side surface 1312 of the central support region 1310A associated with the first body region 1100A and the side surface 1312 of the central support region 1310A associated with the second body region 1100B. A selected one of the work pieces 100 thus can be received into the channel 1320 formed by the central support region 1310A associated with the first body region 1100A and the central support region 1310A associated with the second body region 1100B and be engaged and supported by the aperture 1316. To help facilitate the engagement and support of the selected work pieces 100, the end regions 1317 of the central support regions 1310A each can include a chamfered portion 1318 as shown in FIG. 6B.

Figure 7:
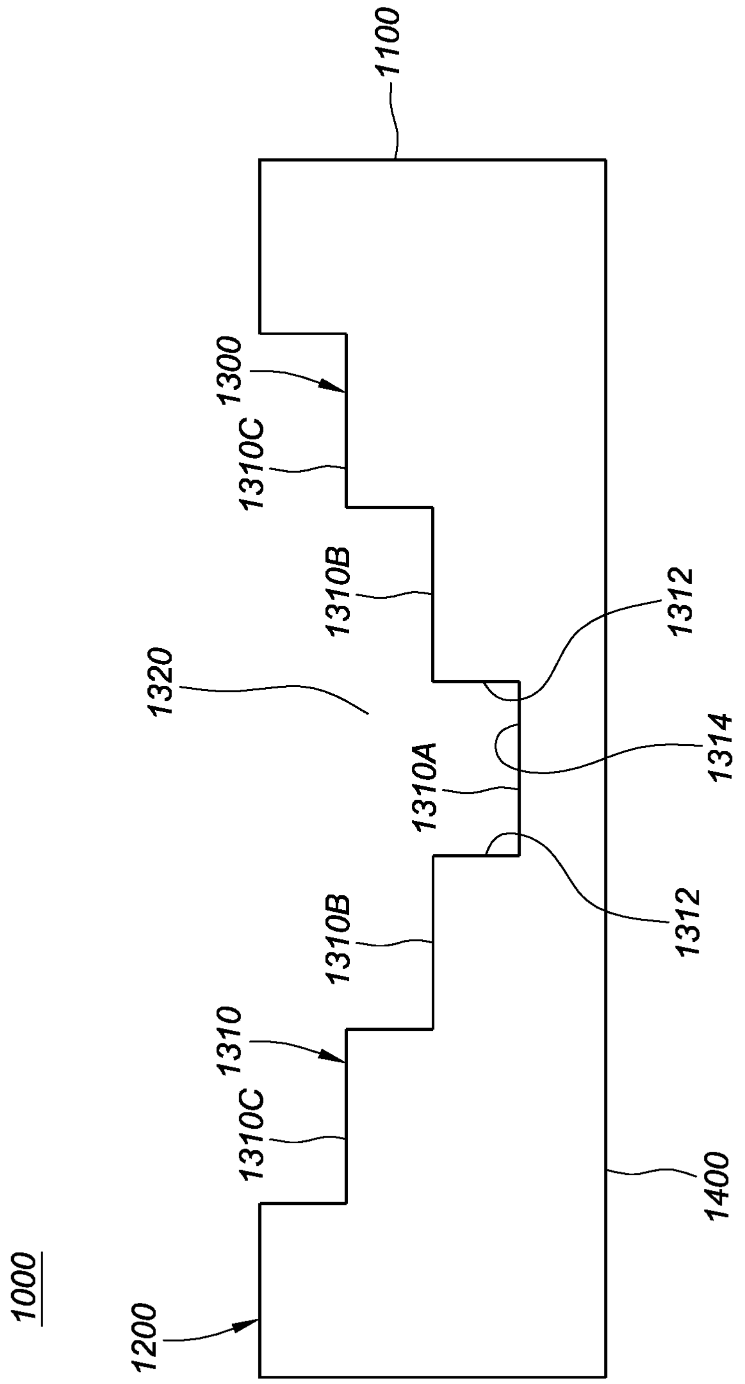
FIG. 7 is an exemplary detail diagram illustrating another alternative embodiment of the working cap system of FIG. 3, wherein the working cap system includes a mounting region.

FIG. 7 illustrates another alternative embodiment of the working cap system 1000. As illustrated in FIG. 7, the working cap system 1000 can include a mounting region 1400. The mounting region 1400 can enable the working cap system 1000 to be installed on a support structure (not shown) at a work area in a workshop, a construction site or any other work environment. Although the working cap system 1000 can be disposed in a fixed location, such as within a building, the working cap system 1000 advantageously can be applied in portable applications.

Figure 8:
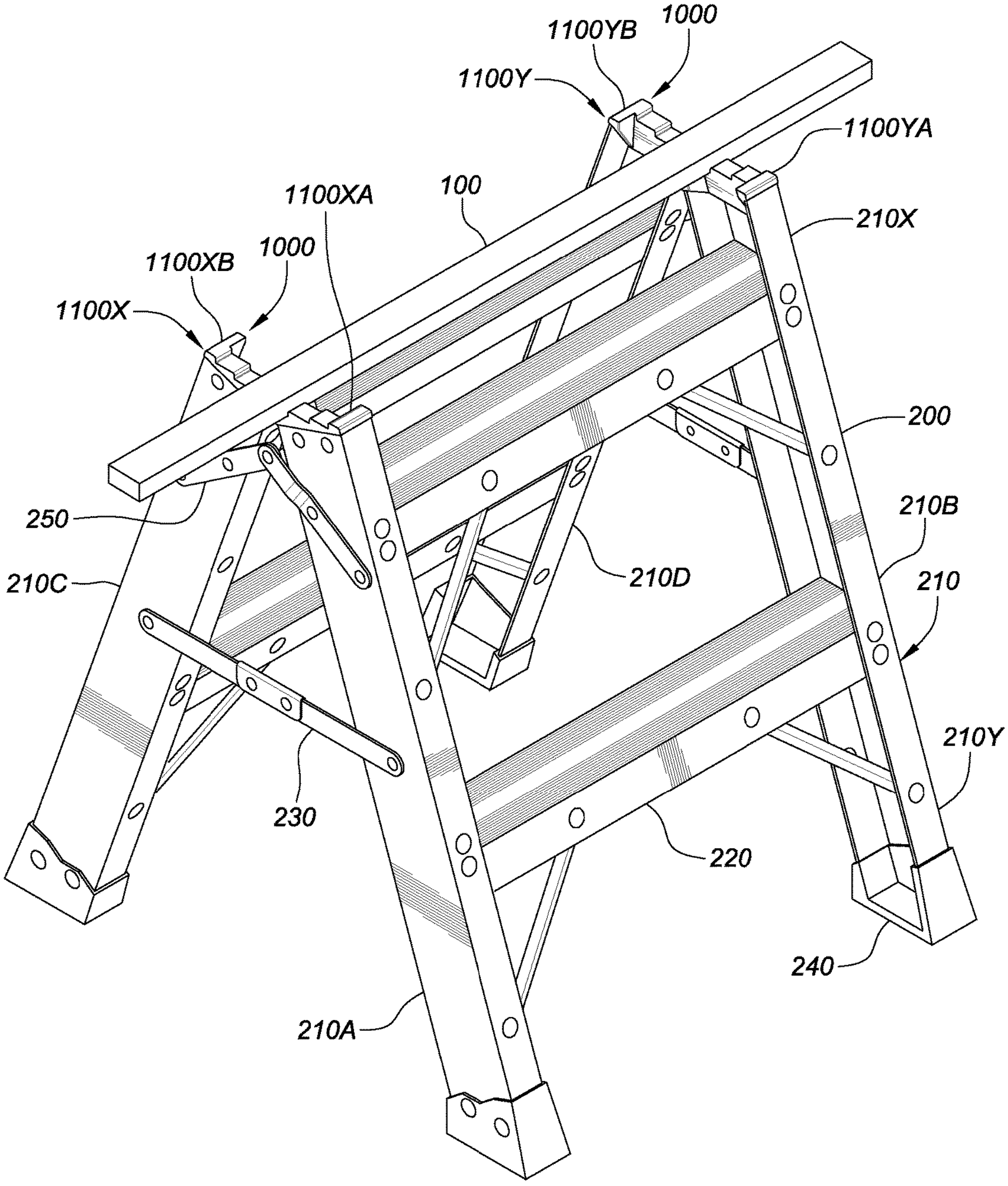
FIG. 8 is an exemplary detail diagram illustrating the working cap system of FIG. 6B, wherein the working cap system is installed on a ladder.

Turning to FIG. 8, the working cap system 1000 is shown as being disposed on a ladder 200 via a mounting region 1400 (shown in FIG. 7). Exemplary types of ladders can include a step ladder, an extension ladder, a platform ladder, a step stool, a multipurpose ladder, a telescoping ladder, a folding ladder or any other conventional type of ladder without limitation.

The ladder 200 can include one or more side rails 210. The side rails 210 preferably are provided in side rail pairs each including a top rail portion 210X and a bottom rail portion 210Y. Feet (or braces) 240 optionally can be provided at the bottom rail portions 210Y for safety and stability. As shown in FIG. 8, the ladder 200 can include a first pair of side rails 210A, 210B. The side rails 210A, 210B are separated by a predetermined distance and coupled by one or more steps (or other cross members) 220.

The ladder 200 of FIG. 8 is illustrated as including an optional second pair of side rails 210C, 210D. The side rails 210C, 210D can be provided in the same manner as, or in a different manner from, side rails 210A, 210B. FIG. 8 shows the side rails 210C, 210D as being separated by, and coupled by, one or more steps (or other cross members) 220. A distance between the side rails 210C, 210D can be greater than, less than, or equal to the predetermined distance between the side rails 210A, 210B.

The top rail portion 210X of the side rail 210A is shown as being coupled with the top rail portion 210X of the side rail 210C via a first hinge system 250; whereas, the top rail portion 210X of the side rail 210B is shown as being coupled with the top rail portion 210X of the side rail 210D via an optional second hinge system 250. Thereby, the ladder 200 can be arranged in a closed position, wherein the bottom rail portions 210Y of the side rails 210A, 210C are adjacent to each other and wherein the bottom rail portions 210Y of the side rails 210B, 210D are adjacent to each other, for facilitating transport and/or storage of the ladder 200. The ladder 200 alternatively can be arranged in an open (or deployed) position, wherein the bottom rail portions 210Y of the side rails 210A, 210C are separated from each other and the bottom rail portions 210Y of the side rails 210B, 210D are separated from each other, in which the ladder 200 is ready for use.

A first spreader system 230 can couple the side rails 210A, 210C. The first spreader system 230 advantageously can lock the side rails 210A, 210C in place when the ladder 200 is in the open position for added safety and stability. An optional second spreader system 230 can couple the side rails 210B, 210D. Advantageously, the second spreader system 230 can lock the side rails 210B, 210D in place when the ladder 200 is in the open position to further enhance safety and stability.

The working cap system 1000 can be installed at any suitable location, such as adjacent to the top rail portions 210X, on the ladder 200. In one embodiment, the working cap system 1000 can be provided as a top cap for the side rails 210. The working cap system 1000 can be fixedly coupled with, and/or removably coupled with, the ladder 200.

As illustrated in FIG. 8, the working cap system 1000 can include first and second main bodies 1100X, 1100Y. The first main body 1100X, in turn, can comprise first and second body regions 1100XA, 1100XB; whereas, the second main body 1100Y can comprise first and second body regions 1100YA, 1100YB. Thereby, the first body region 1100XA can be provided as a top cap for the left side rail 210A in the first pair; whereas, the second body region 1100XB can be provided as a top cap for a corresponding left side rail 210C in the second pair. The first body region 1100YA similarly can be provided as a top cap for right side rail 210B in the first pair; whereas, the second body region 1100YB can be provided as a top cap for a corresponding right side rail 210D in the second pair.

When the spreaders 230 are in the locked position, the bottom rail portions 210Y of the first and second pairs of side rails 210 are separated, and the ladder 200 is ready for use. Separation of the bottom rail portions 210Y also can bring the top rail portions 210X of the side rails 210 together, positioning the body regions 1100XA, 1100XB of the main body 1100X and body regions 1100YA, 1100YB of the main body 1100Y for engaging and supporting respective portions of the selected work piece 100 in the manner set forth above. Although shown and described as comprising first and second main bodies 1100X, 1100Y with reference to FIG. 8 for purposes of illustration only, the working cap system 1000 can include any suitable number of main bodies 1100. For example, the working cap system 1000 can comprise a single main body 1100 that at least partially spans (or completely spans) the predetermined distance between a selected pair of the side rails 210. Additionally and/or alternatively, the single main body 1100 can be disposed on a selected step (or other cross member) 220 of the ladder 200 and/or can comprise a new cross member (or a part of a new cross member) to be added to the ladder 220.

Figure 9A:
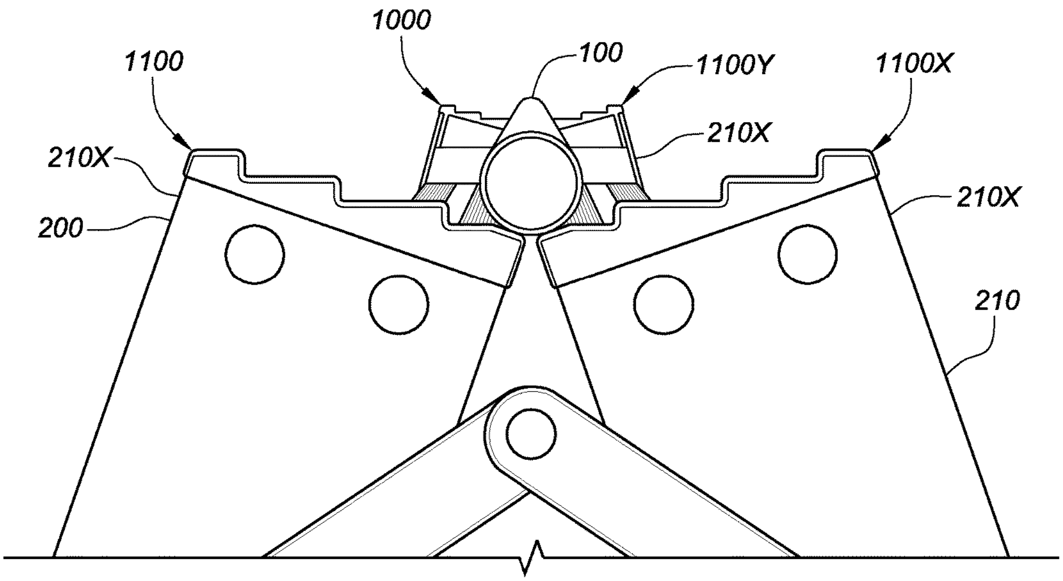
FIG. 9A is an exemplary detail diagram illustrating a side view of the working cap system of FIG. 8, wherein the working cap system is shown as supporting a work piece with a round cross-section.
Figure 9B:
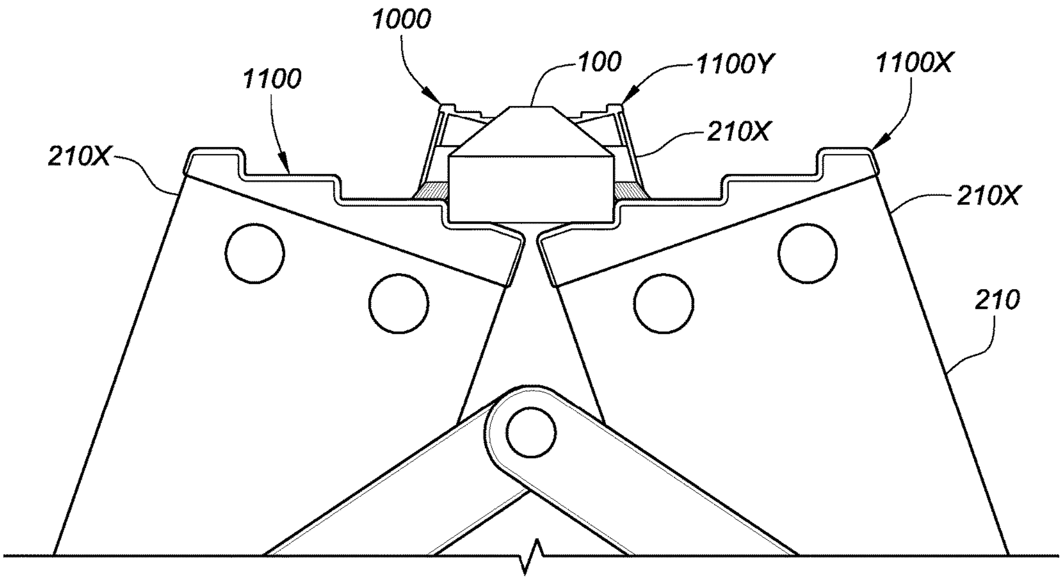
FIG. 9B is an exemplary detail diagram illustrating a side view of the working cap system of FIG. 8, wherein the working cap system is shown as supporting a work piece with a small rectangular cross-section.
Figure 9C:
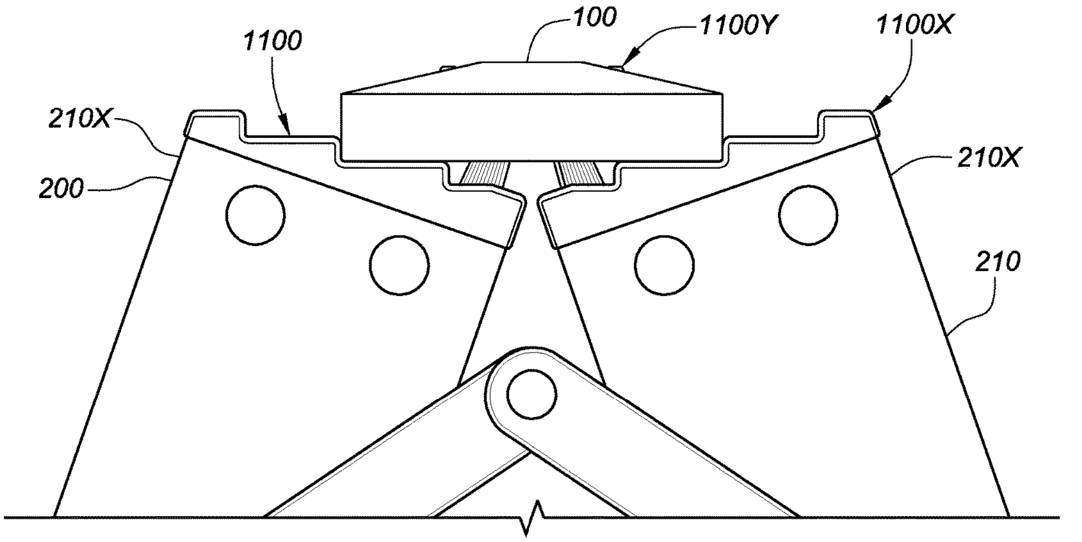
FIG. 9C is an exemplary detail diagram illustrating a side view of the working cap system of FIG. 8, wherein the working cap system is shown as supporting a work piece with a medium rectangular cross-section.
Figure 9D:
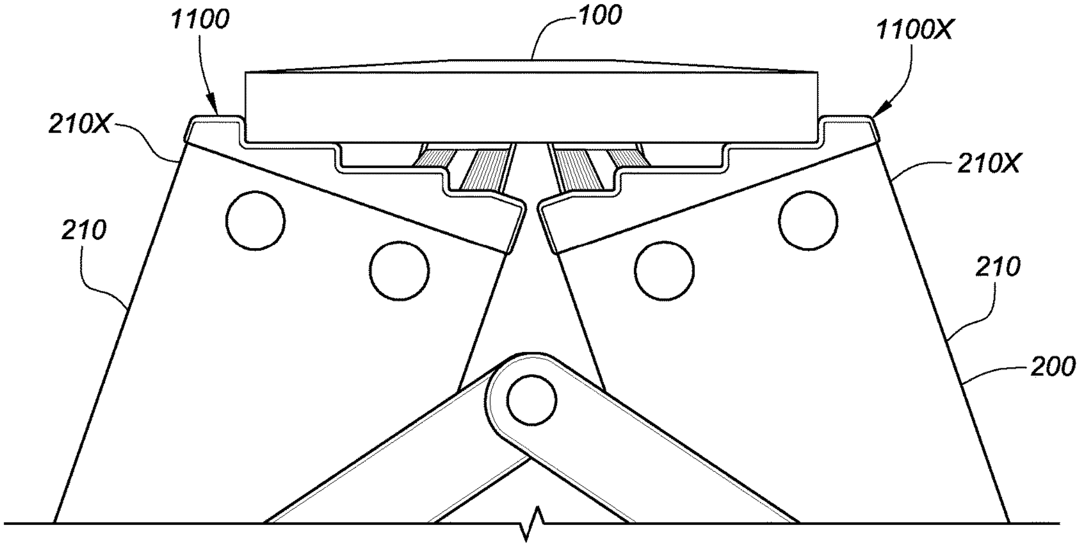
FIG. 9D is an exemplary detail diagram illustrating a side view of the working cap system of FIG. 8, wherein the working cap system is shown as supporting a work piece with a large rectangular cross-section.

FIGS. 9A-D illustrate the working cap system 1000 of FIG. 8 as engaging and supporting selected work pieces 100 with respective cross-sections, shapes and sizes. FIG. 9A, for example, shows the first and second main bodies 1100X, 1100Y engaging and supporting a selected work piece 100 with a round cross-section in the manner set forth in more detail above with reference to FIG. 5B. The first and second main bodies 1100X, 1100Y alternatively are shown in FIGS. 9B-D as engaging and supporting respective work pieces 100 with rectangular cross-sections in the manner set forth in more detail above with reference to FIGS. 4A-B. The work piece 100 of FIG. 9B has a small rectangular cross-section and thus is engaged and supported by a central support region 1310A (shown in FIG. 6B) of the first main body 1100X and a central support region 1310A of the second main body 1100Y. In FIG. 9C, the work piece 100 has a medium rectangular cross-section and shown as being engaged and supported by a peripheral support region 1310B (shown in FIG. 6B) of the first main body 1100X and a peripheral support region 1310B of the second main body 1100Y. FIG. 9D shows a work piece 100 with a medium rectangular cross-section that is being engaged and supported by a peripheral support region 1310C (shown in FIG. 6B) of the first main body 1100X and a peripheral support region 1310C of the second main body 1100Y.

Although shown and described with reference to FIGS. 8 and 9A-D as being installed on a ladder 200 with two pairs of rails 210 for purposes of illustration only, the working cap system 1000 can be installed on any conventional type of ladder, including a ladder with only one pair of rails 210.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A working cap system, comprising:

a first body being disposed at a top rail portion of a first side rail of a ladder, having a first upper surface and first distal and proximal portions and including a plurality of first partial support regions having first depths relative to the first upper surface, the first depths of the first partial support regions progressively decreasing from the first distal portion to the first proximal portion; and a second body being separate from said first body, being disposed at a top rail portion of a second side rail of the ladder, having a second upper surface and second distal and proximal portions and including a plurality of second partial support regions having second depths relative to the second upper surface, the second depths of the second partial support regions progressively decreasing from the second distal portion to the second proximal portion, wherein the first body and the second body cooperate to support a selected work piece via a predetermined first partial support region and a corresponding second partial support region.

2. The working cap system of claim 1, wherein, when the first distal portion is disposed adjacent to the second distal portion, the predetermined first partial support region cooperates with the corresponding second partial support region to form a composite support region being bounded by a first side surface of the predetermined first partial support region and a second side surface of the corresponding second partial support region.

3. The working cap system of claim 2, wherein the first partial support regions and the second partial support regions define a central channel for receiving the selected work piece.

4. The working cap system of claim 3, wherein the first partial support region adjacent to the first distal portion of said first body is disposed at a predetermined distance from the second partial support region adjacent to the second distal portion of said second body.

5. The working cap system of claim 4, wherein the first partial support region adjacent to the first distal portion of said first body and the second partial support region adjacent to the second distal portion of said second body define an aperture being in communication with the central channel.

6. The working cap system of claim 4, wherein the first partial support region adjacent to the first distal portion of said first body includes a first chamfered portion that cooperates with a second chamfered portion of the second partial support region adjacent to the second distal portion of said second body.

7. The working cap system of claim 2, wherein a distance between the first side surface and the second side surface is greater than a predetermined cross-section of the selected work piece.

8. The working cap system of claim 1, wherein each of the first partial support regions cooperates with a respective corresponding second partial support region to form a plurality of composite support regions each being bounded by a first side surface of a relevant first partial support region and a second side surface of a relevant corresponding second partial support region.

9. The working cap system of claim 1, wherein the first body includes three of the first partial support regions, and wherein the second body includes three of the second partial support regions.

10. The working cap system of claim 1, wherein the first body further includes a first side surface disposed between adjacent first partial support regions, and wherein the second body further includes a second side surface disposed between adjacent second partial support regions.

11. The working cap system of claim 10, wherein the first and side surfaces cooperate.

12. The working cap system of claim 10, wherein the first side surface extends from a relevant first partial support region at a first predetermined angle, and wherein the second side surface extends from a relevant second partial support region at a second predetermined angle.

13. The working cap system of claim 12, wherein the first predetermined angle is an obtuse angle, the second predetermined angle is an obtuse angle or a combination thereof.

14. The working cap system of claim 1, wherein the first depths, the second depths or both are uniform.

15. The working cap system of claim 1, wherein the first body and the second body are fixedly coupled with the respective top rail portions of the ladder.

16. A method for manufacturing a working cap, comprising:

forming a first body having a first upper surface and first distal and proximal portions and including a plurality of first partial support regions having first depths relative to the first upper surface, the first depths of the first partial support regions progressively decreasing from the first distal portion to the first proximal portion;

disposing the first body at a top rail portion of a first side rail of a ladder;

forming a second body being separate from said first body, having a second upper surface and second distal and proximal portions and including a plurality of second partial support regions having second depths relative to the second upper surface, the second depths of the second partial support regions progressively decreasing from the second distal portion to the second proximal portion; and disposing the second body at a top rail portion of a second side rail of the ladder, wherein the first body and the second body cooperate to support a selected work piece via a predetermined first partial support region and a corresponding second partial support region.

17. The method of claim 16, wherein said forming the first body includes casting the first body, molding the first body, machining the first body or a combination thereof, or wherein said forming the second body includes casting the second body, molding the second body, machining the second body or a combination thereof.

18. A step ladder, comprising:

a first and second pair of cooperating side rails;

a first body being disposed at a top rail portion of a first selected side rail in the first pair of cooperating side rails, having first distal and proximal portions and including a first upper surface adjacent to the first proximal portion and a succession of first partial support regions being associated with respective first side surfaces and having first depths relative to the first upper surface, the first depths progressively decreasing from the first distal portion to the first proximal portion; and a second body being separate from said first body and being disposed at a top rail portion of a first selected side rail in the second pair of cooperating side rails, said second body having second distal and proximal portions and including a second upper surface adjacent to the second proximal portion and a succession of second partial support regions being associated with second respective side surfaces and having second depths relative to the second upper surface, the second upper surface progressively decreasing from the second distal portion to the second proximal portion, wherein said first and second bodies cooperate to define a first central channel for receiving a first end region of a selected work piece via a predetermined first partial support region, an associated first side surface, a corresponding second partial support region and an associated second side surface in an open position of the step ladder during which the first selected side rail in the first pair of cooperating side rail is disposed adjacent to the first selected side rail in the second pair of cooperating side rails.

19. The step ladder of claim 18, further comprising:

a third body being disposed at a top rail portion of a second selected side rail in the first pair of cooperating side rails, having third distal and proximal portions and including a third upper surface adjacent to the third proximal portion and a succession of third partial support regions being associated with respective third side surfaces and having third depths relative to the third upper surface, the third depths progressively decreasing from the third distal portion to the third proximal portion; and a fourth body being separate from said third body and being disposed at a top rail portion of a second selected side rail in the second pair of cooperating side rails, said fourth body having fourth distal and proximal portions and including a fourth upper surface adjacent to the fourth proximal portion and a succession of fourth partial support regions being associated with fourth respective side surfaces and having fourth depths relative to the fourth upper surface, the fourth depths progressively decreasing from the fourth distal portion to the fourth proximal portion, wherein the third and fourth bodies cooperate to define a second central channel for receiving a second end region of the selected work piece via a predetermined third partial support region, an associated third side surface, a corresponding fourth partial support region and an associated fourth side surface in the open position of the step ladder during which the second selected side rail in the first pair of cooperating side rail is disposed adjacent to the second selected side rail in the second pair of cooperating side rails.

20. The step ladder of claim 18, wherein the first partial support region adjacent to the first distal portion of said first body is disposed at a predetermined distance from the second partial support region adjacent to the second distal portion of said second body.

* * * * *